3,767,784
COMPOSITION FOR THE PROTECTION AND
TREATMENT OF INJURED BODY TISSUE
AND METHOD OF UTILIZING THE SAME
Seymour M. Gluck, 395 Barrett Road,
Cedarhurst, N.Y. 11516
No Drawing. Filed Dec. 1, 1970, Ser. No. 94,190
Int. Cl. A61f 13/00
U.S. Cl. 424—28                                                4 Claims

ABSTRACT OF THE DISCLOSURE

Gel-forming substances are used to set and stabilize aerated carbohydrate solutions to form a soft, resilient and stable composition of therapeutic value in the healing of injured body tissues.

The composition is soluble in the body fluids and may be dissolved therein within any predetermined period. By varying the proportions of the principal ingredients or by the addition of suitable modifiers and/or medicaments the rate of dissolution may be altered and the therapeutic properties of the composition may be varied as circumstances may require.

BACKGROUND OF THE INVENTION

This invention relates to the direct treatment of injured mammalian tissues, e.g. abraded, lacerated, ulcerated, or infected tissue, through use of a soluble protective composition which is dissolved in the body fluids contacted thereby within a predetermined period of time. It further relates to such a composition, the components of which may themselves exhibit therapeutic properties, and which may additionally serve as a convenient vehicle or carrier for a variety of selected medicaments to be advantageously applied to, and/or absorbed by, the injured tissues.

As is well known, the skin, supporting body tissues, connective tissues, and viscera are subject to a variety of irritations, infections and injuries. This may result in disruption of normal tissue continuity, configuration and appearance, which may be evident as areas of ulceration, necrosis, contusion, laceration, inflammation, and tumefaction. Conventional dressings applied to such irritated or injured tissues often act as foreign bodies and are frequently themselves a source of irritation which may delay healing.

The local application of simple sugar to inflamed or injured tissues is one of many substances familiar to the healing art. Similarly, the local application of gelatin has also been employed to promote tissue repair.

It is a principal object of the present invention to provide a soluble dressing, filling or cementing material for injured tissue which is soft, flexible, protective, nonirritating, and which provides a temporary nucleus to facilitate the growth of replacement tissues for healing purposes. By virtue of its solubility and the capability of being rendered sterile during the manufacturing process, the subject invention is not restricted to external application but is adaptable to implantation within the body as, for example, in association with a surgical operation. Another object of this invention is to serve as a convenient vehicle for the local application of desirable medicaments. Other objects and advantages of the present invention including stability, convenience, economy and adaptability for use in conjunction with a variety of known dressing materials, will be apparent from the following detailed description of preferred embodiments thereof.

It may be noted that, in this specification and the claims appended hereto, all references to parts and percentages are given by weight and all temperatures are specified in degrees Fahrenheit.

SUMMARY OF THE INVENTION

The present invention is based on the discovery that known healing substances, namely carbohydrates, water and proteinaceous gel-forming materials can be combined and processed in predetermined concentrations so that the resulting product assumes desirable physical characteristics which are different from those of its components. Some of these desirable physical attributes include resiliency, pliability, compressibility, elasticity, malleability, and tackiness. It has been further discovered that these characteristics are such as to provide a physical barrier and protective coating for affected tissues. When employed externally as a surface dressing, the resiliency and similar protective qualities of this material minimize the harmful effects of direct pressure to areas of injury. Additionally, it has been observed that the physical characteristics of this invention are such as to provide a framework which encourages the growth of replacement tissues where normal tissue continuity has been altered. It has also been discovered that, depending on the degree of tackiness provided, this invention can facilitate the cementing of disrupted tissues.

Experience has shown that the subject composition will slowly dissolve following contact with body fluids and that the component ingredients are thereby solubilized and released. The gradual release of these components additionally provides the local therapeutic qualities and benefits which are characteristic of each. The compositions of this invention may be employed, for example, as a filling material for decubitus ulcers and other areas of surface injury. This is accomplished by protecting the otherwise exposed tissues from additional injury, by facilitating improved pressure distribution, by providing a lattice framework which encourages the growth of new tissue, and by providing soluble therapeutic materials which enhance tissue rejuvenation.

In accordance with the invention, a gel-forming substance is incorporated in an aerated, viscous carbohydrate liquid for the treatment of injured mammalian body tissue in amounts such that the gel-former comprises from about 1 to 10% of the total weight, carbohydrates constitute from between 50 to 85% of the total, and water varies from 10 to 40% thereof. When applied to injured tissue, the resulting gelled composition forms a relatively soft, flexible and resilient material which promotes healing and which, moreover, may be dissolved in the body fluids within a period generally of from 12 to 48 hours from the time of application.

The gel-forming constituent of the composition is suitably a proteinaceous material such as gelatin, or a natural or artificial gum such as gum arabic or tragacanth. Other proteinceous materials which may be similarly utilized include ovalbumin (egg albumin), soya protein and casein. Carbohydrate polymers such as dextrin have also been employed for purposes of gel-formation.

The aerated, viscous component of the composition is generally selected from among the various classes of carbohydrates. Useful carbohydrates include monosaccharides, e.g., glucose, fructose; disaccharides, e.g., sucrose, lactose, maltose; and polysaccharides, e.g., dextrin and certain processed and solubilized starches. In some formulations carbohydrates may be utilized in the form of corn syrup, which comprises approximately 80% of mixed saccharides, principally glucose. Invert sugar may also be used as a source of carbohydrate in amounts up to 50% by weight of the total carbohydrate employed. In some formulations a single sugar such as sucrose or glucose has been employed as the sole carbohydrate component in concentrations up to 85% by weight of the total formula. Preferably, sucrose is employed as the principal carbohydrate constituent; the use of glucose is, however, quite acceptable since it is readily metabolized by the cells of regenerating and growing tissues. The amount of the carbohydrate constituent, or the relative amounts of individual carbohydrates when a mixture of such materials is employed, depends upon the uses and properties desired for the final composition.

The compositions of the invention are prepared by a method which involves dispersing the consitituents in an aqueous medium and thereafter gelling the combination to the consistency of a resilient material. Preferably, the desired proportion of gel-forming material is initially dispersed in about 25 to 65% of the total proportion of water allotted for the formulation. The mixture is allowed to stand until a gel is formed. This may take up to several hours depending upon the properties of the gel-forming material employed.

The remaining proportion of water is combined with the selected quantities of carbohydrate material by stirring and slowly heating in a kettle or double boiler until all solids are completely dissolved. The heating is continued to temperatures of from 170° to 240° F., and a syrup is produced. The syrup is then whipped, beaten, and rapidly combined with the previously prepared gelled mixture. This may be accomplished at temperatures between 70° and 240° F., temperatures of from 130°–160° F. being preferred.

The duration and speed of whipping is adjusted so that a desirable final consistency is attained. The control of whipping temperatures and the duration of the whipping process will each affect the properties of the final product. The whipping time, for example, may vary from 1 to 2 minutes to several hours, although a period of 10 to 15 minutes is often satisfactory. Specially modified gelatin, additives and medicaments may be incorporated during this stage.

The final mixture is then either poured into suitable molds for slow cooling for an 8 to 12 hour period or is combined with gauze, cotton or other materials before cooling and setting is completed. It may also be combined with a variety of creams and lotions to impart body to them or to serve as a base.

The heating process results in a biologically sterile product, and sterility may be further assured by appropriate selection and preparation of all ingredients, use of filtered and treated air, and careful attention to sterility-control during all phases of production and packaging to thus assure the preparation of aseptic products.

It will be understood that various modifications may be made in the ingredients and processing of the composition herein described without departing from the scope of the present invention. Thus, it is within the purview of my invention to so formulate the composition that it will dissolve in body fluids in any desired period (depending upon the site of application), generally within periods of from about two hours to several days. For such purpose, the rate of tissue solubility may be decreased by altering part or all of the gel-forming material in the mixture. In the case of gelatin, this may be accomplished by heating the final aerated mixture to temperatures of approximately 170°–260° F. for a period of 2 to 12 hours with continuation of aeration and agitation. An alternative method would encompass pre-treating a gelatin solution for 2 to 6 hours at room temperature with 2 to 10 mg., preferably 2 to 4 mg., of formalin solution U.S.P. for each gram of gelatin to be treated. The thus modified gelatin, unlike the pre-soaked gelatin which is used for the initial gelling phase, is added to the final mixture during the later whipping and aeration stage in amounts up to 50% of the total weight of the ingredients.

Other methods for decreasing the solubility of the composition or otherwise modifying the physical properties thereof (e.g., for altering the body, flexibility or compressibility thereof) include the addition of a variety of additives, especially insoluble metallic salts such as zinc oxide and aluminum silicate, natural and artificial gums, bentonite clays, methyl cellulose, sodium carboxymethyl cellulose and starches. These are added in amounts up to 15% of the total weight of the ingredients. It is to be understood that modification of the solubility or other physical characteristics of the composition by use of the indicated additives necessarily affects the choice and range of application of the final material for therapeutic purposes.

Tackiness and pliability are enhanced by decreasing the proportion of gel-forming material, varying the relative proportions of the carbohydrate components, increasing the water content, and by the addition of plasticizing agents such as glycerine or propylene glycol in amounts up to 5% of the total weight of material. Surfactants of the nonionic type, e.g., polyoxyethylene sorbitan monooleate (Polysorbate-80) may be added in small amounts not exceeding 1% of the composition.

The composition hereof possesses the intrinsic healing properties of each of its principal constituents, i.e. proteinaceous substances, carbohydrates and water, while additionally serving as a protective, soft, resilient vehicle which will gradually dissolve following contact with body fluids, e.g., blood, plasma, serum, exudates and the like. Since it has the properties of a hypertonic agent, it tends to draw and attract the body's extracellular fluids into the area, enhancing the therapeutic effect of the composition hereof. This provides a valuable means for conveying and locally distributing such desirable medicaments and other healing and/or growth affecting substances as antibiotics, hormones, vitamins, blood derivatives, and specific chemical agents. The present composition serves as a binder or vehicle for such medicaments, these being admixed in desirable quantities during the manufacturing process and uniformly distributed therethrough.

Alternatively, the treatment composition may, in various pre-formed configurations, serve as a mechanical means for the application of selected therapeutic agents. In one such application, the composition is provided in the form of a semi-rigid, waffle-like layer, into the recesses of which a medicament(s) may be received for treatment of the injured body tissue at the time of application of the composition thereto.

The composition of this invention may itself be applied as a dressing to injured tissues in any desired configuration, or it may be applied in combination with commonly employed dressing means as, for example, by impregnation in, or coating on, materials such as adhesive strips, gauze pads, absorbent cotton, fabric or plastic bandages and the like. When employed alone, the composition may readily be cut, formed, molded, or otherwise processed into any size, shape or configuration its direct application may require. Accordingly, when used alone as a dressing material it may be provided in bulk containers, or preformed and individually packaged as products for specific applications.

PREFERRED EMBODIMENTS OF THE INVENTION

The use of gelatin as the gel-forming constituent of the treatment composition is preferred in amounts of from 1 to 4.5% by weight thereof. Sucrose, glucose, corn syrup and invert sugar are the preferred sources of the carbohydrate constituent of the composition. These have been utilized in various combinations, preferably in amounts of from 65 to 80% of the total formulation. The water content is preferably between 20 and 35%.

When corn syrup is employed as part of the carbohydrate constituent of the composition, formulations comprising gelatin in amounts between about 1 and 4.5% by weight, sucrose in amounts between about 40 and 55%, corn syrup approximately 15 to 30%, and water between about 20 and 35% are particularly preferred. When invert sugar comprises a portion of the carbohydrate ingredient, it is incorporated in the compositions in amounts of from about 5–30% by weight of the total sugars employed. When glucose is so utilized, it may comprise up to 100% of the total carbohydrates employed.

Additives, modifiers, denatured or treated gelatin, or selected therapeutic substances are preferably added to the final mixture during the aeration stage of manufacture. These do not generally exceed 15% of the total weight of formulation although certain additives, therapeutic agents in particular, may occasionally be added in concentrations of up to as much as 50% of the total weight of the formulation.

Various preferred forms of the treatment composition of the present invention are described in the following examples which, it will be understood, shall be interpreted as illustrative only and not in a limiting sense.

EXAMPLE 1

The following constituents are mixed to provide one example of the composition hereof:

| Ingredients: | Weight in ounces |
| --- | --- |
| Gelatin | 3.0 |
| Water | 36.0 |
| Granulated sucrose | 64.0 |
| Light corn syrup | 24.0 |

3.0 ounces of gelatin are prepared by soaking in 18.0 ounces of cold water for at least one-half hour. Simultaneously, a smooth syrup is prepared by blending and heating the remaining 18.0 ounces of water, 64.0 ounces of granulated sucrose, and 24.0 ounces of light corn syrup, to 240° F. The heated syrup is then combined with the soaked gelatin and vigorously whipped and aerated for approximately 10 minutes.

The mixture thus formed is poured into suitable molds and allowed to set at room temperature for 8 to 12 hours, forming a product suitable for direct insertion into ulcerated or other injured areas. Alternatively, gauze pads or similar dressing materials may be impregnated with the mixture; after cooling and gelation the impregnated dressing may be employed for surface application to injured tissue.

EXAMPLE 2

The following constituents are mixed to provide a further example of the composition hereof:

| Ingredients: | Weight in ounces |
| --- | --- |
| Gelatin | 2.0 |
| Water | 27.0 |
| Granulated sucrose | 60.0 |
| Corn syrup | 27.0 |
| Invert sugar | 10.0 |

2.0 ounces of gelatin are soaked in 11.0 ounces of cold water for approximately 20 minutes at room temperature. A smooth syrup is prepared by slowly heating 16.0 ounces of water, 60.0 ounces of granulated sucrose; 27.0 ounces of corn syrup and 10.0 ounces of invert sugar to a temperature of about 235° F. The syrup is permitted to cool to about 140° F. and the pre-soaked gelatin is then added. The mixture is maintained at about 110° F. and beaten for several minutes, until the desired consistency is obtained. It is then molded for clinical application as required.

EXAMPLE 3

The following constituents are mixed to provide a further example of the composition hereof:

| Ingredients: | Weight in ounces |
| --- | --- |
| Gelatin | 2.0 |
| Water | 44.0 |
| Granulated sucrose | 88.0 |

2.0 ounces of gelatin is dispersed in 12 ounces of water at room temperature for one hour. 88.0 ounces of sucrose is dissolved in the remaining 32.0 ounces of water by heating to 230° F. with agitation. The syrup thus produced is adjusted to 130–160° F., and the gelatin-water mixture is added thereto. This combination is then vigorously whipped and aerated for several minutes until thickening and a desirable consistency is obtained. At this point the material may be applied to gauze pads or other suitable dressing means or, alternatively, it may be poured into special molds so as to provide a pre-formed dressing.

EXAMPLE 4

The following constituents are mixed to provide a sterile product incorporating the composition hereof:

| Ingredients: | Weight in ounces |
| --- | --- |
| Sterilized gelatin | 2.5 |
| Sterile water | 40.0 |
| Glucose | 65.0 |
| Granulated sucrose | 40.0 |

2.5 ounces of sterilized gelatin is soaked in 22.0 ounces of sterile cold water for approximately 30 minutes. 18.0 ounces of water, 65.0 ounces of glucose, and 40.0 ounces of granulated sucrose are combined and heated to 240° F. to prepare a sterile syrup. The syrup is cooled to 160° F. and the pre-soaked, prepared gelatin is added. The composition is whipped in sterilized equipment in an atmosphere of washed, filtered and pre-heated air, until a desired consistency is obtained.

The mixture may have incorporated therein any suitable medicament for topical and/or systemic use. For example, an antibiotic such as oxytetracycline hydrochloride is suitably incorporated in the above formulation at a concentration of about 5% by weight thereof. The composition incorporating such medicament is then poured into suitable molds and allowed to gel to form a product suitable for insertion into ulcerated or other injured areas. Alternatively, gauze pads or other dressing materials may be impregnated with the oxytetracycline or other antibiotic-containing composition and the impregnated dressings utilized for surface application.

EXAMPLE 5

The following ingredients are mixed to provide a further example of the composition hereof:

| Ingredients: | Weight in ounces |
| --- | --- |
| Gelatin | 3.0 |
| Glycerine | 4.0 |
| Water | 52.0 |
| Granulated sucrose | 64.0 |
| Glucose | 32.0 |

3.0 ounces of gelatin are soaked for one-half hour in a double boiler containing 26.0 ounces of water maintained at 140° F. 64.0 ounces of granulated sucrose, 32.0 ounces of glucose, and 26.0 ounces of water are simultaneous mixed and heated to 240° F. 4.0 ounces of glycerine are added and mixed either with the heated syrup or, alternatively, with the pre-soaked gelatin. The heated syrup is combined with the gelatin mixture and whipped for approximately 10 minutes until a desired consistency is obtained. It is then cooled and processed for use as a dressing material.

EXAMPLE 6

The following constituents are mixed to provide a further example of the composition hereof:

| Ingredients: | Weight in ounces |
| --- | --- |
| Gelatin | 3.0 |
| Oatmeal powder | 4.0 |
| Water | 40.0 |
| Granulated sucrose | 32.0 |
| Light corn syrup | 24.0 |

3.0 ounces of gelatin are soaked in 18.0 ounces of water at room temperature for one hour. 22.0 ounces of water are brought to boiling, at which time 4.0 ounces of oatmeal powder are slowly added thereto with thorough mixing. 32.0 ounces of granulated sucrose and 24.0 ounces of light corn syrup are then added to the boiled mixture and heating is continued to 230° F. The resulting syrup is then combined with the pre-soaked gelatin and thoroughly whipped until a desired consistency is obtained. The mixture is then processed for packaging as a topical dressing material.

It will be understood that the preceding should be interpreted as illustrative and not in a limiting sense, and that the scope of the invention is to be construed in the light of the following claims.

I claim:

1. A method for treating diseased or injured abraded, lacerated or ulcerated body tissue, which comprises applying thereto to thereby provide a temporary nucleus to facilitate growth of replacement tissues for healing purposes, a soft and flexible gelled soluble dressing, filling or cementing composition consisting essentially of an effective local therapeutic amount of a saccharide and an effective tissue repair promoting local amount of gelatin.

2. The method of claim 1, in which said composition is the gelation product of an aerated mixture of from 50 to 85% by weight sucrose, from 1 to 10% by weight gelatin, and from 10 to 40% by weight water.

3. The method of claim 1, in which the composition consists essentially of the gelation prdouct of an aerated mixture of from 40 to 55% by weight of sucrose, from 15 to 30% by weight corn syrup, from 1 to 4.5% by weight gelatin, and from 20 to 35% by weight water.

4. The method of claim 1, in which the composition is applied by direct implantation into an ulcer or other injured tissue.

References Cited
UNITED STATES PATENTS

| | | | |
|---|---|---|---|
| 2,320,098 | 5/1943 | Quisling | 424—360 X |
| 1,304,600 | 5/1919 | Pond | 424—360 X |
| 3,429,308 | 2/1969 | Russell | 128—1 |
| 2,841,528 | 7/1958 | Myhre | 424—361 X |
| 2,676,136 | 4/1954 | Myhre | 424—361 X |
| 1,642,653 | 9/1927 | Goldstein | 424—360 X |
| 2,949,401 | 8/1960 | Wershaw | 424—361 X |
| 1,809,082 | 6/1931 | Urkov et al. | 424—360 X |

SHEP K. ROSE, Primary Examiner

U.S. Cl. X.R.

424—35, 37, 177, 180, 360, 361